US012636929B2

(12) United States Patent
Denoual et al.

(10) Patent No.: US 12,636,929 B2
(45) Date of Patent: May 26, 2026

(54) HEAT-ENERGY EXCHANGE DEVICE COMPRISING TWO PLATE HEAT EXCHANGERS

(71) Applicant: VALEO SYSTEMES THERMIQUES, La Verriere (FR)

(72) Inventors: Christophe Denoual, La Verriere (FR); Julien Veron, La Verriere (FR)

(73) Assignee: Valeo Systemes Thermiques, Cergy Pontoise (FR)

( * ) Notice: Subject to any disclaimer, the term of this patent is extended or adjusted under 35 U.S.C. 154(b) by 911 days.

(21) Appl. No.: 17/773,199

(22) PCT Filed: Oct. 20, 2020

(86) PCT No.: PCT/FR2020/051890
§ 371 (c)(1),
(2) Date: May 30, 2023

(87) PCT Pub. No.: WO2021/084189
PCT Pub. Date: May 6, 2021

(65) Prior Publication Data
US 2023/0311612 A1 Oct. 5, 2023

(30) Foreign Application Priority Data
Oct. 29, 2019 (FR) ...................................... 1912090

(51) Int. Cl.
*B60H 1/00* (2006.01)
(52) U.S. Cl.
CPC ..... *B60H 1/00328* (2013.01); *B60H 1/00807* (2013.01)

(58) Field of Classification Search
CPC .... F28D 1/05391; F28D 9/005; F28D 9/0056; F28D 9/0093; F28D 9/0246;
(Continued)

(56) References Cited

U.S. PATENT DOCUMENTS 7,469,554 B2 12/2008 Martins et al.
9,121,643 B2 * 9/2015 Schaefer ........... H01M 10/6569
(Continued)

FOREIGN PATENT DOCUMENTS

CN 109154474 A 1/2019
CN 109791004 A 5/2019
(Continued)

OTHER PUBLICATIONS

China Patent Office, Office Action (with Machine translation) of corresponding Chinese Patent Application No. 202080083300.4, dated Dec. 31, 2024, 9 pages.
(Continued)

*Primary Examiner* — Nelson J Nieves
(74) *Attorney, Agent, or Firm* — Valeo Systemes Thermiques

(57) ABSTRACT

Heat-energy exchange device having a first and a second plate heat exchanger, each plate heat exchanger being configured to allow exchanges of heat energy between at least two heat-transfer fluids at different temperatures. The exchange device further includes a distribution member sandwiched between the first and second plate heat exchangers, the distribution member including a series of channels made within it, the channels connecting inlets and outlets of heat-transfer fluid of the first and second plate heat exchangers to connection orifices positioned on the distribution chamber.

20 Claims, 14 Drawing Sheets

(58) Field of Classification Search
CPC .......... F28D 9/0037; F28D 2021/0082; B60H
1/00328; B60H 1/00807; B60H 1/00335;
B60H 1/3229
See application file for complete search history.

(56) References Cited

U.S. PATENT DOCUMENTS

| | | | |
|---|---|---|---|
| 10,260,817 B2 * | 4/2019 | Fetzer ........................ F28F 3/08 | |
| 10,989,481 B2 | 4/2021 | Crawford et al. | |
| 2006/0131009 A1 * | 6/2006 | Nies .................... F28D 1/05391 | |
| | | | 165/177 |
| 2008/0087410 A1 | 4/2008 | Muller-Lufft et al. | |
| 2012/0060550 A1 | 3/2012 | Mann | |
| 2014/0071622 A1 * | 3/2014 | Aoki .................. H05K 7/20163 | |
| | | | 361/700 |

| | | | |
|---|---|---|---|
| 2018/0231324 A1 * | 8/2018 | Fetzer ...................... F28F 3/08 | |
| 2023/0311612 A1 | 10/2023 | Denoual et al. | |

FOREIGN PATENT DOCUMENTS

| | | | | |
|---|---|---|---|---|
| CN | 110300877 A | 10/2019 | | |
| CN | 114787572 A | 7/2022 | | |
| FR | 2846733 A1 | 5/2004 | | |
| FR | 2946733 A1 | 5/2004 | | |
| WO | WO-2010108907 A1 * | 9/2010 | ......... B60H 1/00342 | |

OTHER PUBLICATIONS

European Patent Office, International Search Report (with English translation) and Written Opinion of corresponding international Application No. PCT/FR2020/051890, dated Jan. 22, 2021.

* cited by examiner

HEAT-ENERGY EXCHANGE DEVICE COMPRISING TWO PLATE HEAT EXCHANGERS

CROSS-REFERENCE TO RELATED APPLICATIONS

This application is filed under 35 U.S.C. § 371 U.S. National Phase of International Application No. PCT/FR2020/051890 filed Oct. 20, 2020 (published as WO2021084189), which claims priority benefit to French application No. 1912090 filed on Oct. 29, 2019, the disclosures of which are herein incorporated by reference in their entirety.

TECHNICAL FIELD

The present invention relates to the field of plate heat exchangers. More particularly, the invention relates to plate heat exchangers in the automotive field.

BACKGROUND OF THE INVENTION

In the automotive field and more particularly in the field of electric or hybrid vehicles, it is known practice to use the cooling power generated by an air conditioning circuit to cool the batteries. To this end, one or more plate heat exchangers allow the exchange of heat energy between a heat transfer fluid circulating in a battery thermal management loop and a low-pressure refrigerant fluid circulating in the air conditioning circuit.

Nevertheless, the use of fast battery charging is becoming essential for the acceptance of electric mobility. However, the faster the charging process, the higher the electric current and therefore the higher the amount of heat to be dissipated. The demand for cooling power is thus greatly increased. The same applies to fast discharge at high driving speeds.

One known solution for providing this additional cooling power is to use a plate heat exchanger allowing a very high level of thermal power for exchange between the heat transfer fluid and the refrigerant fluid. A large plate heat exchanger is usually used for this purpose. However, such a plate heat exchanger makes it possible to cover a wide range of thermal powers because it meets the need at high load, but not at medium load as its thermal power falls with the drop in fluid flow rates and poor distribution in the bundle of plates.

One of the aims of the present invention is to at least partially overcome the drawbacks of the prior art and to provide a plate heat exchanger in which the thermal power is optimal for different operating loads.

BRIEF SUMMARY OF THE INVENTION

The present invention therefore relates to a heat-energy exchange device comprising a first and a second plate heat exchanger, each plate heat exchanger being configured to allow exchanges of heat energy between at least two heat transfer fluids at different temperatures, said exchange device further comprising a distribution member sandwiched between the first and second plate heat exchangers, said distribution member comprising a series of channels made within it, said channels connecting heat transfer fluid inlets and outlets of the first and second plate heat exchangers to connection ports arranged on said distribution member.

According to one aspect of the invention, the distribution member comprises a heat transfer fluid intake connection port connected to a heat transfer fluid inlet of one of the plate heat exchangers, the distribution member comprising an expansion device for expansion of the heat transfer fluid secured to said heat transfer fluid intake connection port.

According to another aspect of the invention, the distribution member comprises a heat transfer fluid outlet connection port connected to a heat transfer fluid outlet of one of the plate heat exchangers, the distribution member comprising an opening emerging in said heat transfer fluid outlet connection port, a heat transfer fluid pressure and/or temperature sensor being inserted in said opening.

According to another aspect of the invention, the heat transfer fluid intake connection port comprising an expansion device is connected to a heat transfer fluid outlet connection port by a circulation circuit passing through the plate heat exchanger.

According to another aspect of the invention, the expansion device and the heat transfer fluid pressure and/or temperature sensor are arranged within a single assembly module secured to the distribution member.

According to another aspect of the invention, the first and second plate heat exchangers each comprise a first heat transfer fluid circulation circuit connecting a first heat transfer fluid inlet and a first heat transfer fluid outlet and a second circulation circuit connecting a second heat transfer fluid inlet and a second heat transfer fluid outlet, the distribution member comprising:

a first face on which the second plate heat exchanger is arranged, said first face comprising:
  a first emerging end of a first channel positioned opposite the first heat transfer fluid inlet of said second plate heat exchanger and connected to a first connection port by said first channel,
  a second emerging end of a second channel positioned opposite the first heat transfer fluid outlet of said second plate heat exchanger and connected to a second connection port by said second channel,
  a third emerging end of a third channel positioned opposite the second heat transfer fluid inlet of said second plate heat exchanger and connected to a third connection port by said third channel,
  a fourth emerging end of a fourth channel positioned opposite the second heat transfer fluid outlet of said second plate heat exchanger and connected to a fourth connection port by said fourth channel,
a second face on which the first plate heat exchanger is arranged, said second face comprising:
a fifth emerging end of a fifth channel positioned opposite the first heat transfer fluid inlet of said first plate heat exchanger and connected to a fifth connection port by said fifth channel,
a sixth emerging end of a sixth channel positioned opposite the first heat transfer fluid outlet of said first plate heat exchanger and connected to a sixth connection port by said sixth channel,
a seventh emerging end of a seventh channel positioned opposite the second heat transfer fluid inlet of said first plate heat exchanger and connected to a seventh connection port by said seventh channel,
an eighth emerging end of an eighth channel positioned opposite the second heat transfer fluid outlet of said first plate heat exchanger and connected to an eighth connection port by said eighth channel.

According to another aspect of the invention, at least one of the first or second plate heat exchangers comprises a third circulation circuit, the heat transfer fluid inlet and outlet of which are arranged outside the distribution member.

According to another aspect of the invention, the distribution member is made up of two components:

a first component comprising:

a first face on which the second plate heat exchanger is arranged, said first face comprising the first emerging end of the first channel and the second emerging end of the second channel, and a second face on which the first plate heat exchanger is arranged, said second face comprising the seventh emerging end of the seventh channel and the eighth emerging end of the eighth channel, a second component comprising:

a first face on which the second plate heat exchanger is arranged, said first face comprising the third emerging end of the third channel and the fourth emerging end of the fourth channel, and a second face on which the first plate heat exchanger is arranged, said second face comprising the fifth emerging end of the fifth channel and the sixth emerging end of the sixth channel.

According to another aspect of the invention, the distribution member is made in one piece.

According to another aspect of the invention, at least some of the connection ports are arranged on the edge of the distribution member.

BRIEF DESCRIPTION OF THE DRAWINGS

Further features and advantages of the present invention will become more clearly apparent upon reading the following description, which is provided by way of a non-limiting illustration, and with reference to the accompanying drawings, in which.

DETAILED DESCRIPTION OF THE INVENTION

In the various figures, identical elements bear the same reference numbers.

The following embodiments are examples. Although the description refers to one or more embodiments, this does not necessarily mean that each reference relates to the same embodiment, or that the features apply only to a single embodiment. Individual features of different embodiments can also be combined and/or interchanged in order to provide other embodiments.

In the present description, some elements or parameters can be indexed, such as, for example, a first element or a second element and a first parameter and a second parameter or even a first criterion and a second criterion, etc. In this case, this is simply indexing for differentiating and denominating elements or parameters or criteria that are similar but not identical. This indexing does not imply the priority of one element, parameter or criterion over another and such denominations can be easily interchanged without departing from the scope of the present description. This indexing also does not imply an order in time, for example, for assessing such or such a criterion.

In the various figures, a trihedron XYZ is shown in order to facilitate understanding and to indicate the different orientations of the views in said figures relative to one another.

Figure 1:
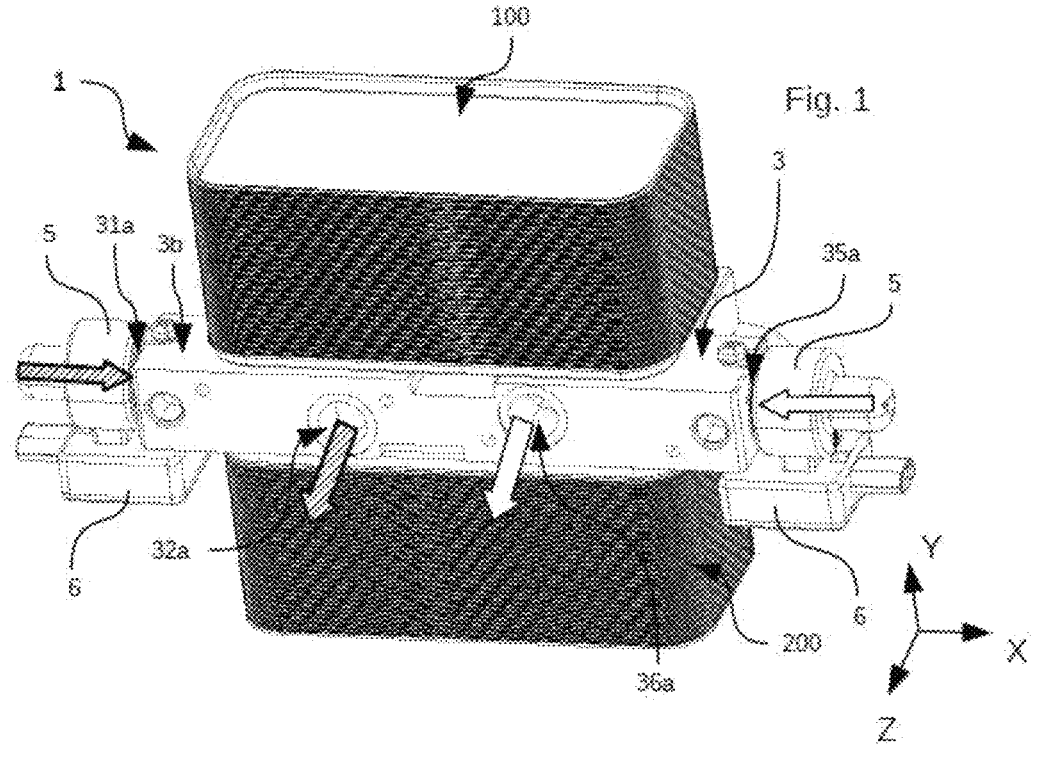
FIG. 1 is a schematic perspective view of a heat-energy exchange device.
Figure 2:
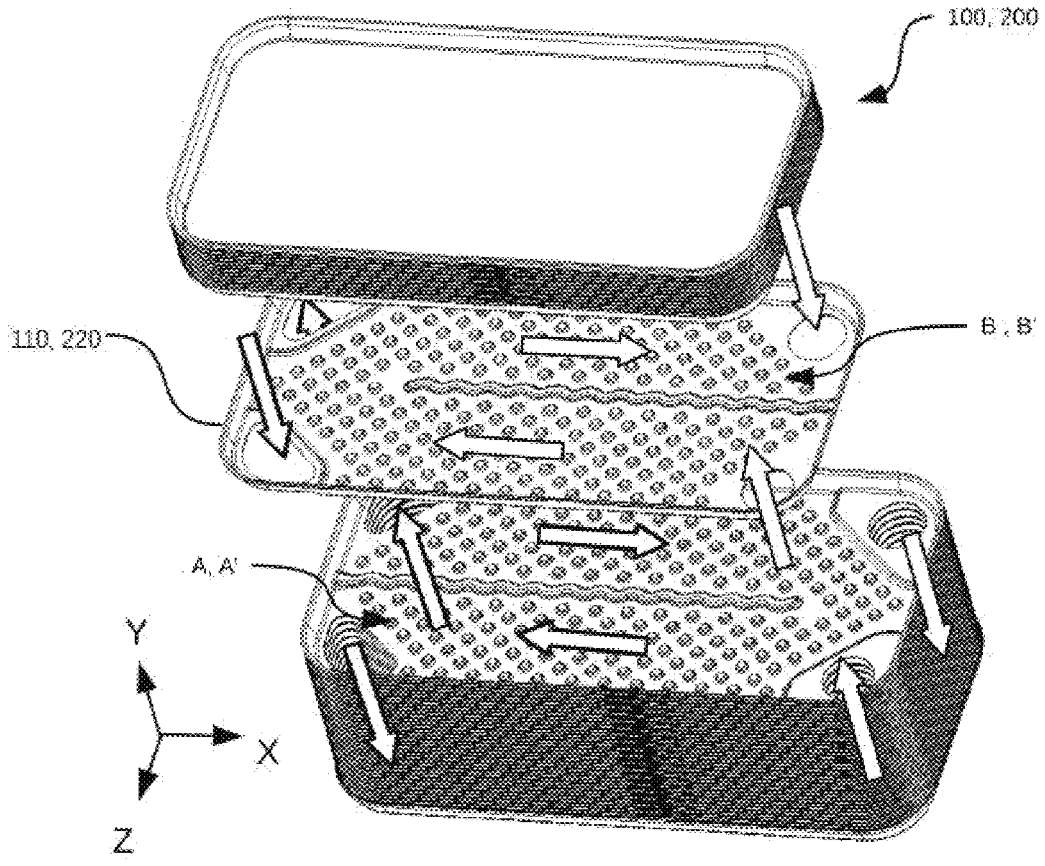
FIG. 2 is an exploded schematic perspective view of a plate heat exchanger.

FIG. 1 shows a heat-energy exchange device 1 comprising a first 100 and a second 200 plate heat exchanger and a distribution member 3 sandwiched between the first 100 and second 200 plate heat exchangers. Each plate heat exchanger 100, 200 is configured to allow exchanges of heat energy between at least two heat transfer fluids at different temperatures. To this end, the plate heat exchangers 100, 200 each comprise a stack of plates 110, 210 defining at least two heat transfer fluid circulation circuits A, A' and B, B', as shown in FIG. 2. These circulation circuits A, A' and B, B' allow an exchange of heat energy between the two heat transfer fluids.

Figure 3A:
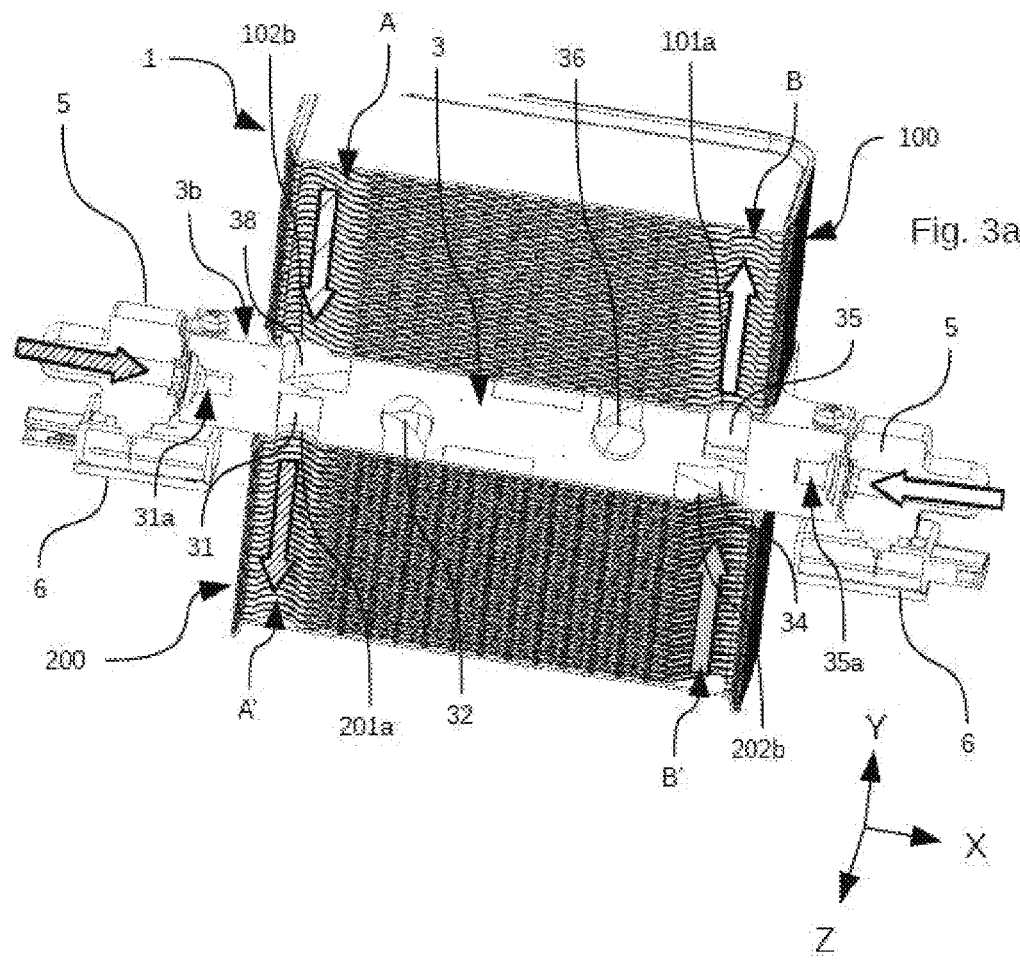
FIG. 3a is a schematic perspective view according to a second cross section through the heat-energy exchange device of FIG. 1.
Figure 3B:
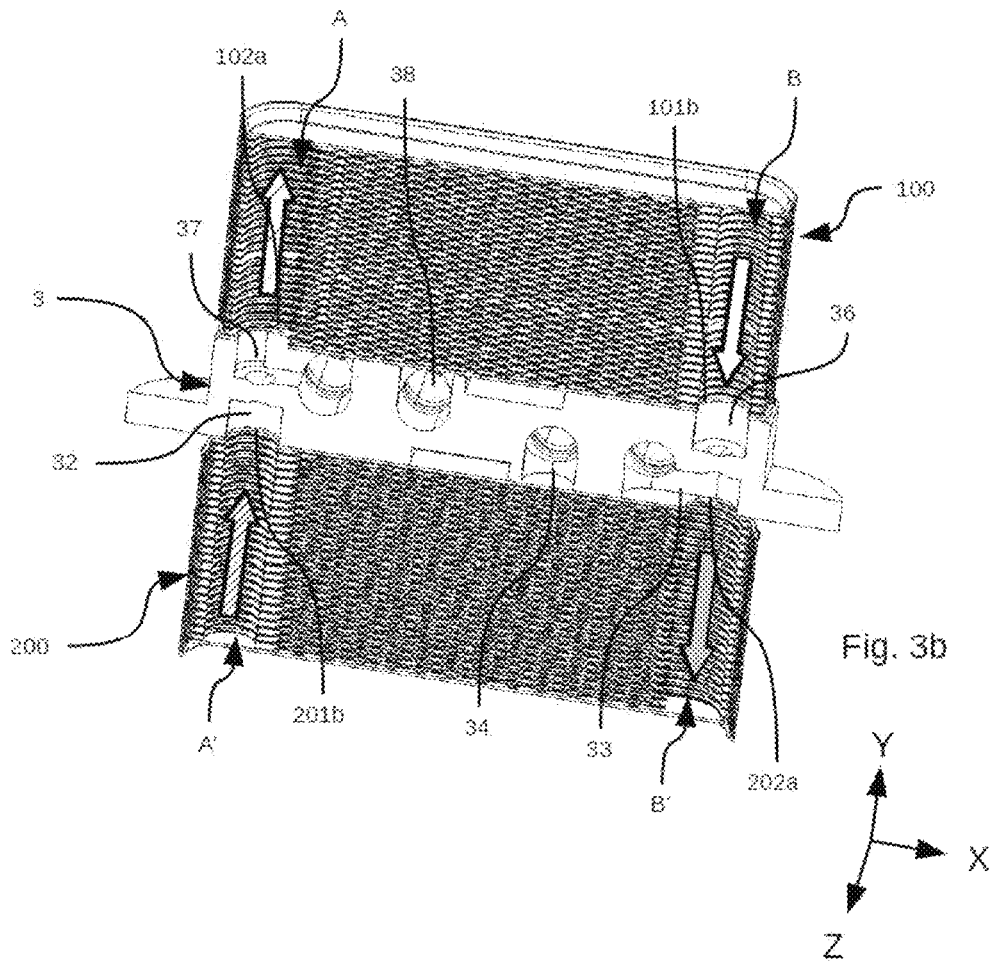
FIG. 3b is a schematic perspective view according to a first cross section through the heat-energy exchange device of FIG. 1.

FIGS. 3a and 3b show more specifically the heat-energy exchange device 1 of FIG. 1 in two different cross sections. FIG. 3a is a cross section through a first inlet 101a and a second outlet 102b of the first plate heat exchanger 100 and through a first inlet 201a and a second outlet 202b of the second plate heat exchanger 200. FIG. 3b is a cross section through a second inlet 102a and a first outlet 101b of the first plate heat exchanger 100 and through a second inlet 202a and a first outlet 201b of the second plate heat exchanger 200.

The first plate heat exchanger 100 thus comprises:

a first heat transfer fluid circuit A (represented by a white arrow) connecting the first heat transfer fluid inlet 101a to the first heat transfer fluid outlet 101b, and a second heat transfer fluid circuit B (represented by an arrow with broad hatching) connecting the second heat transfer fluid inlet 102a to the second heat transfer fluid outlet 102b.

Similarly, the second plate heat exchanger 200 comprises:

a first heat transfer fluid circuit A' (represented by a tightly hatched arrow) connecting the first heat transfer fluid inlet 201a to the first heat transfer fluid outlet 201b, and a second heat transfer fluid circuit B' (represented by a gray arrow) connecting the second heat transfer fluid inlet 202a to the second heat transfer fluid outlet 202b.

Figure 4A:
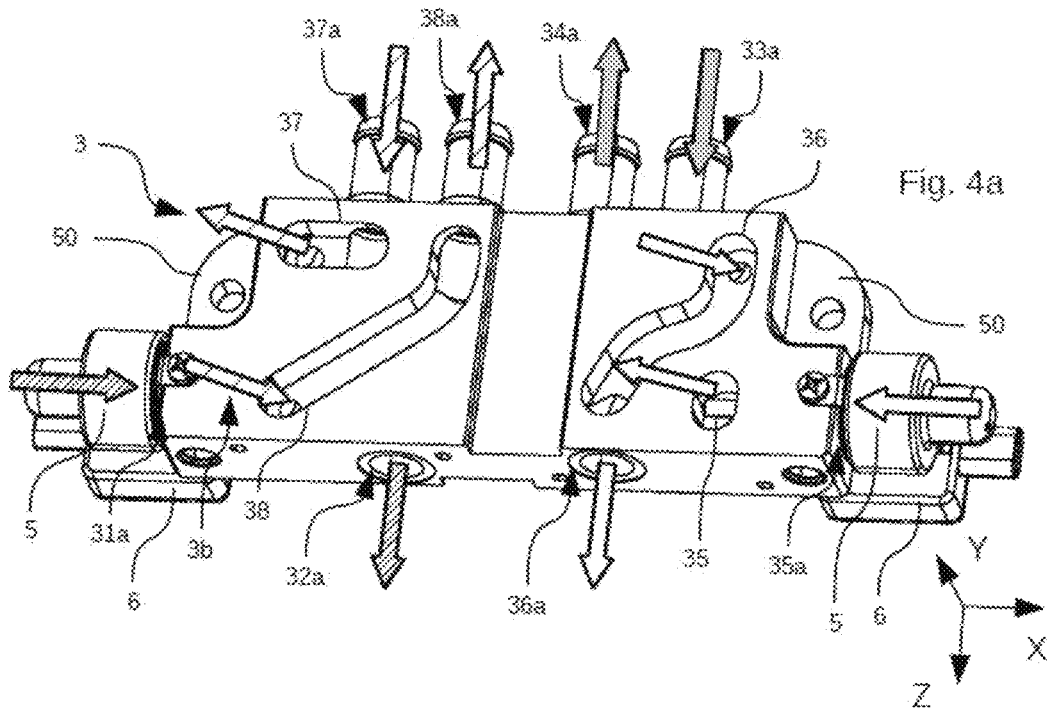
FIG. 4a is a schematic perspective view of the first face of a distribution member.
Figure 4B:
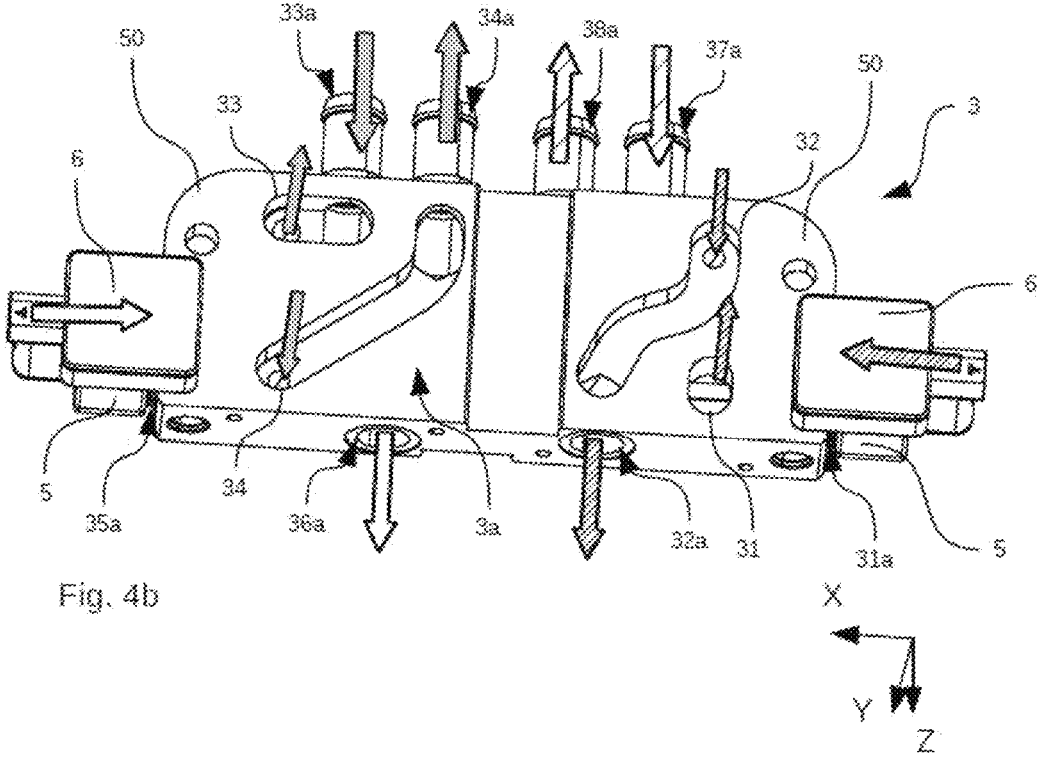
FIG. 4b is a schematic perspective view of the second face of a distribution member.

FIGS. 4a and 4b show in more detail a distribution member 3 from two different directions. As shown in FIGS. 3a and 3b and in FIGS. 4a and 4b, the distribution member 3 comprises a series of channels 31, 32, 33, 34, 35, 36, 37, 38 made within it and connecting the heat transfer fluid inlets 101a, 102a, 201a, 202a and heat transfer fluid outlets 101b, 102b, 201b, 202b of the first 100 and second 200 plate heat exchangers to connection ports 31a, 32a, 33a, 34a, 35a, 36a, 37a, 38a arranged on said distribution member 3.

These connection ports 31a, 32a, 33a, 34a, 35a, 36a, 37a, 38a allow connection of the distribution member 3, and therefore of the heat-energy exchange device 1, with heat transfer fluid circulation loops between which exchanges of heat energy will take place.

The distribution member 3 thus allows the distribution and collection of the various heat transfer fluids circulating in the plate heat exchangers 100, 200. In addition, the fact that the distribution member 3 is sandwiched between the first 100 and the second 200 plate heat exchangers makes it possible to obtain a heat-energy exchange device 1 that is compact.

At least some of the connection ports 31a, 32a, 33a, 34a, 35a, 36a, 37a, 38a are arranged on the edge of the distribution member 3. This thus allows easy connection with the heat transfer fluid circulation loops between which heat energy exchanges will take place via the heat-energy exchange device 1.

The distribution member 3 can in particular be made of a metal such as, for example, aluminum or aluminum alloy. The plate heat exchangers 100, 200 can also be made of aluminum or aluminum alloy. Thus it is possible, during the same brazing step, to secure together the different plates forming the bundle of plates of the plate heat exchangers 100, as well as to secure said plate heat exchangers 100, 200 to the distribution member 3.

It is however entirely possible to contemplate a distribution member 3 made of another material such as plastic or composite material, for example. The plate heat exchangers 100, 200 can then be secured in other ways such as for example by adhesive bond or by tie rods.

The channels 31, 32, 33, 34, 35, 36, 37, 38 and the connection ports 31a, 32a, 33a, 34a, 35a, 36a, 37a, 38a can be molded (for example in the case of a plastic distribution member made by molding) or machined from a block of material.

The distribution member 3 can also include fastening lugs 50 to facilitate assembly of the heat-energy exchange device 1 within the motor vehicle.

Aiming for compactness and ease of assembly within a motor vehicle, the distribution member 3 can comprise a connection port 35a, 37a for the intake of heat transfer fluid connected to the first 101a or second 102a heat transfer fluid inlet of the first plate heat exchanger 100. The distribution member 3 can in particular comprise an expansion device 5 for expansion of the heat transfer fluid, secured to said intake connection port 35a, 37a. More particularly, the expansion device 5 can be an electronic expansion valve comprising a connection housing 6. In FIGS. 1 to 3b, only the intake connection port 35a connected to the first heat transfer fluid inlet 101a of the first plate heat exchanger 100 comprises such an expansion device 5.

This is particularly useful for a first heat transfer fluid circulation circuit A within the first plate heat exchanger 100 connected to a cooling loop such as an air conditioning circuit via this intake connection port 35a. The heat transfer fluid circulating in this first circulation circuit A of the first plate heat exchanger 100 will then be a refrigerant fluid.

The same can apply to the first A' or the second B' heat transfer fluid circulation circuit of the second plate heat exchanger 200. The distribution member 3 can thus comprise an expansion device 5 for expansion of the heat transfer fluid, secured to the heat transfer fluid intake connection port 31a, 33a connected to a heat transfer fluid inlet 201a, 202a of the second plate heat exchanger 200.

Figure 5:
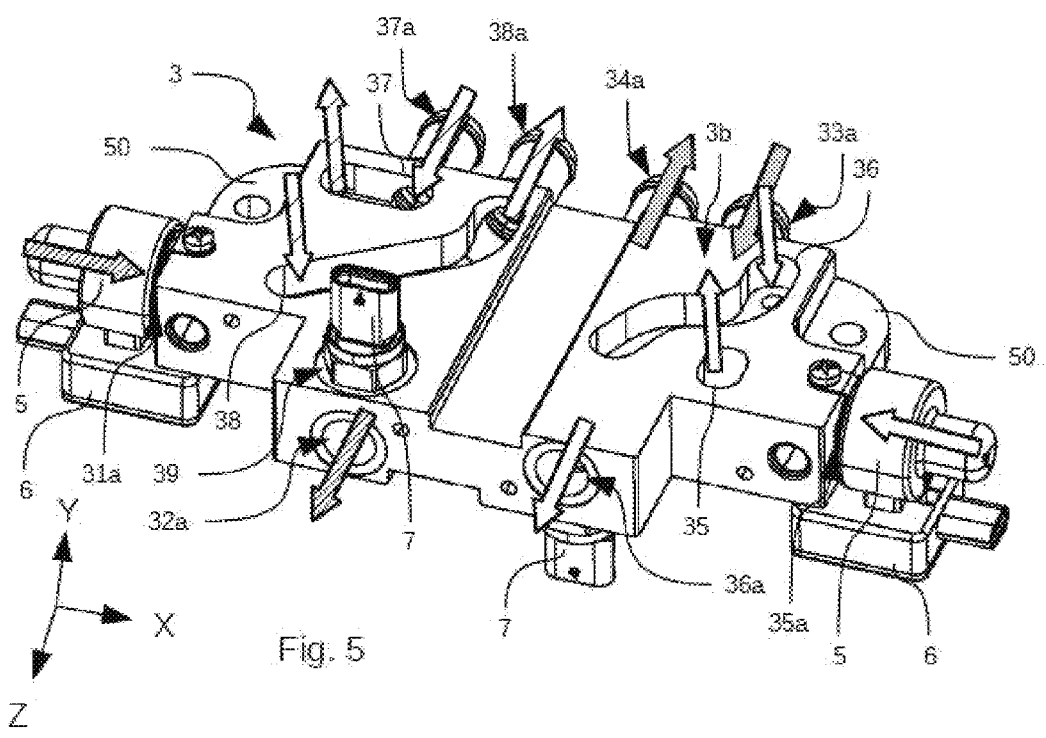
FIG. 5 is a schematic perspective view of a distribution member according to a first particular embodiment.

According to a particular embodiment shown in FIG. 5, the distribution member 3 comprises a heat transfer fluid outlet connection port 32a, 34a connected to a heat transfer fluid outlet 201b, 202b of the second plate heat exchanger 200. The distribution member 3 has an opening 39 emerging in said heat transfer fluid outlet connection port 32a, 34a. A heat transfer fluid pressure and/or temperature sensor 7 can thus be inserted in said opening 39 and measure the pressure and/or temperature of the heat transfer fluid at the outlet of the second plate heat exchanger 200. In FIG. 5, only the heat transfer fluid outlet connection port 32a connected to the first outlet 201b of the second plate heat exchanger 200 has such an opening 39 and a pressure and/or temperature sensor 7.

As also shown in FIG. 5, the same can apply to the first A or the second B heat transfer fluid circulation circuit of the first plate heat exchanger 100. The distribution member 3 can thus comprise an opening 39 and a pressure and/or temperature sensor 7 at the heat transfer fluid outlet connection port 36a, 38a connected to a heat transfer fluid outlet 101b 102b of the first plate heat exchanger 100.

Preferably, the heat transfer fluid intake connection port 31a, 35a comprising an expansion device 5 is connected to a heat transfer fluid outlet connection port 32a, 36a by a circulation circuit passing through the plate heat exchanger 100 or 200. Thus, it is possible to control the pressure of the heat transfer fluid at the inlet of the plate heat exchanger 100, 200 and to measure the pressure and/or the temperature at the outlet of said plate heat exchanger 100, 200 at the inlet as required. For example, in the context of a refrigerant fluid, the expansion device 5 can control the pressure by adjusting the quantity of refrigerant fluid injected into the plate heat exchanger 100, 200 as a function of the superheating of the refrigerant fluid in the gaseous state at the outlet of the plate heat exchanger 100, 200.

Figure 6:
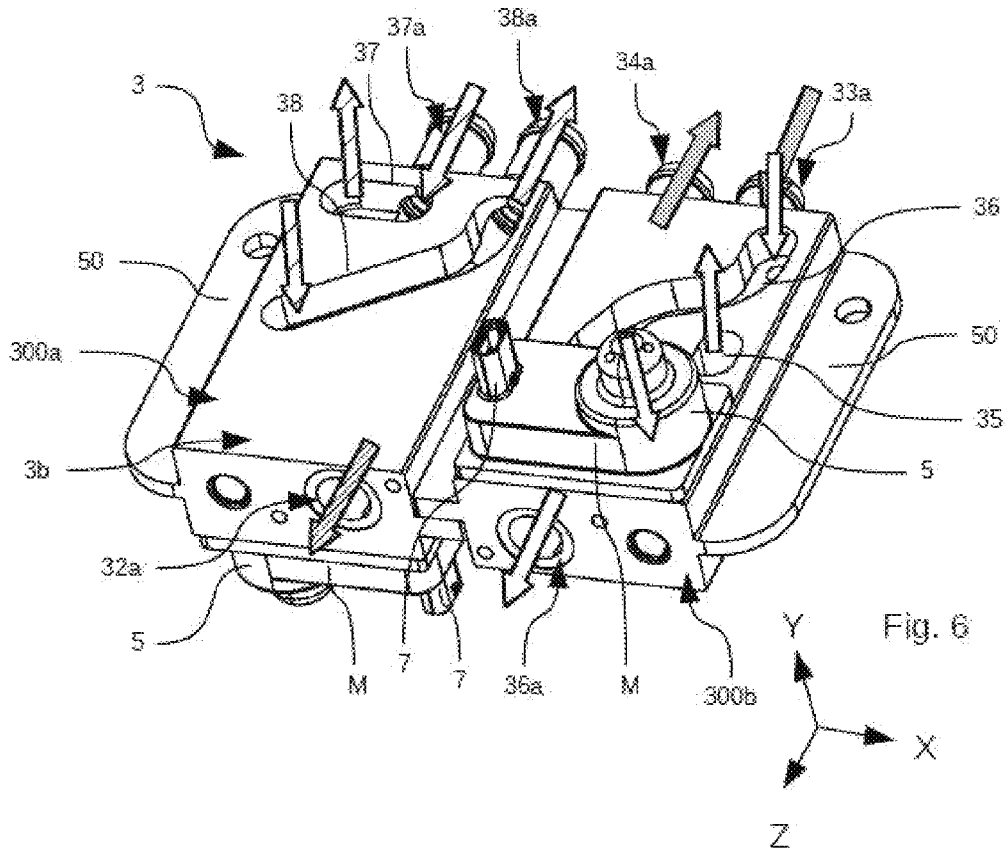
FIG. 6 is a schematic perspective view of a distribution member according to a second particular embodiment.

FIG. 6 shows a variant of the embodiment of FIG. 5. In this variant, the expansion device 5 and the heat transfer fluid pressure and/or temperature sensor 7 are arranged within a single assembly module M secured to the distribution member 3. This makes it possible to group these elements together and to limit the number of connectors. This facilitates assembly within the motor vehicle.

As shown in FIGS. 1 to 6 and in particular in FIGS. 1 to 4b, the distribution member 3 more specifically comprises a first face 3a (visible in FIG. 4b) on which is arranged the second plate heat exchanger 200 and a second face 3b (visible in FIG. 4a), opposite the first face 3a, on which is arranged the first plate heat exchanger 100.

The first face 3a thus comprises:

a first emerging end of a first channel 31 positioned opposite the first heat transfer fluid inlet 201a of the second plate heat exchanger 200 and connected to a first connection port 31a by said first channel 31, a second emerging end of a second channel 32 positioned opposite the first heat transfer fluid outlet 201b of the second plate heat exchanger 200 and connected to a second connection port 32a by said second channel 32, a third emerging end of a third channel 33 positioned opposite the second heat transfer fluid inlet 202*a* of the second plate heat exchanger 200 and connected to a third connection port 33*a* by said third channel 33, and a fourth emerging end of a fourth channel 34 positioned opposite the second heat transfer fluid outlet 202*b* of the second plate heat exchanger 200 and connected to a fourth connection port 34*a* by said fourth channel 34.

The second face 3*b* for its part comprises:

a fifth emerging end of a fifth channel 35 positioned opposite the first heat transfer fluid inlet 101*a* of the first plate heat exchanger 100 and connected to a fifth connection port 35*a* by said fifth channel 35, a sixth emerging end of a sixth channel 36 positioned opposite the first heat transfer fluid outlet 101*b* of the first plate heat exchanger 100 and connected to a sixth connection port 36*a* by said sixth channel 36, a seventh emerging end of a seventh channel 37 positioned opposite the second heat transfer fluid inlet 102*a* of the first plate heat exchanger 100 and connected to a seventh connection port 37*a* by said seventh channel 37, and an eighth emerging end of an eighth channel 38 positioned opposite the second heat transfer fluid outlet 102*b* of the first plate heat exchanger 100 and connected to an eighth connection port 38*a* by said eighth channel 38.

According to a first embodiment shown in FIGS. 1 to 5, the distribution member 3 is made in one piece.

Figure 7:
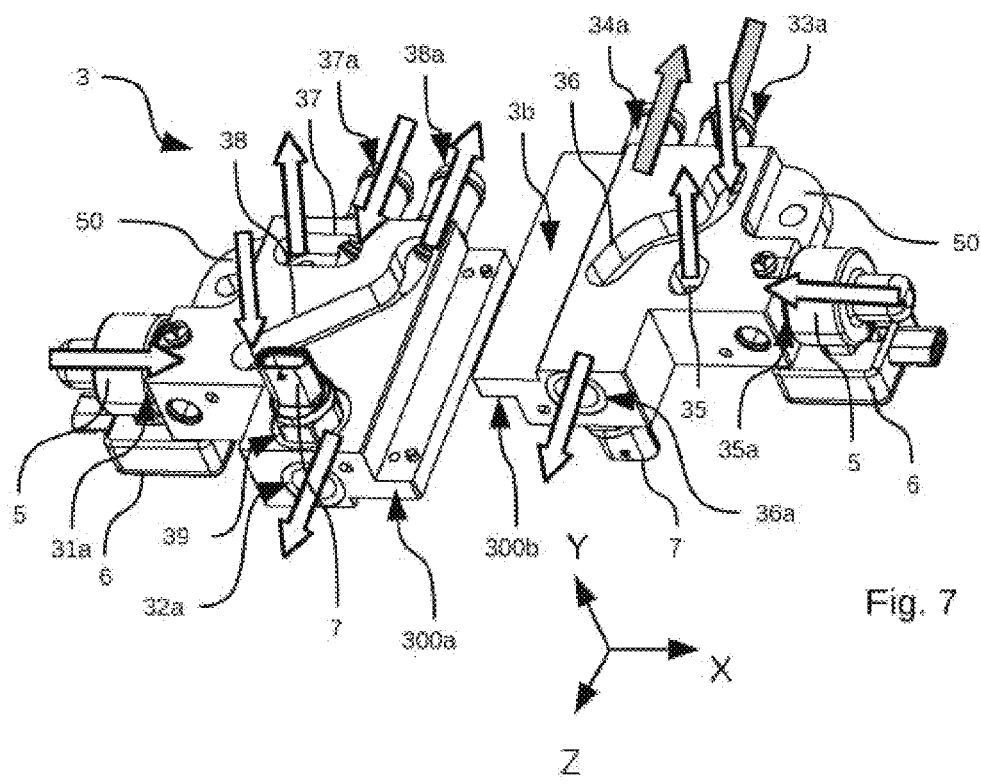
FIG. 7 is a schematic perspective view of a distribution member according to a third particular embodiment.

According to a second embodiment shown in FIGS. 6 and 7, the distribution member 3 can be made up of two components. A first component 300*a* thus comprises:

a first face 3*a* on which the second plate heat exchanger 200 is arranged, said first face 3*a* comprising the first emerging end of the first channel 31 and the second emerging end of the second channel 32, and a second face 3*b* on which the first plate heat exchanger 100 is arranged, said second face 3*b* comprising the seventh emerging end of the seventh channel 37 and the eighth emerging end of the eighth channel 38.

A second component 300*b* for its part comprises:

a first face 3*a* on which the second plate heat exchanger 200 is arranged, said first face 3*a* comprising the third emerging end of the third channel 33 and the fourth emerging end of the fourth channel 34, and a second face 3*b* on which the first plate heat exchanger 100 is arranged, said second face 3*b* comprising the fifth emerging end of the fifth channel 35 and the sixth emerging end of the sixth channel 36.

The distribution member 3 with its multitude of connection ports 31*a*, 32*a*, 33*a*, 34*a*, 35*a*, 36*a* 37*a*, 38*a* allows the heat-energy exchange device 1 to connect to different circulation loops in order to form different architectures.

Figure 8:
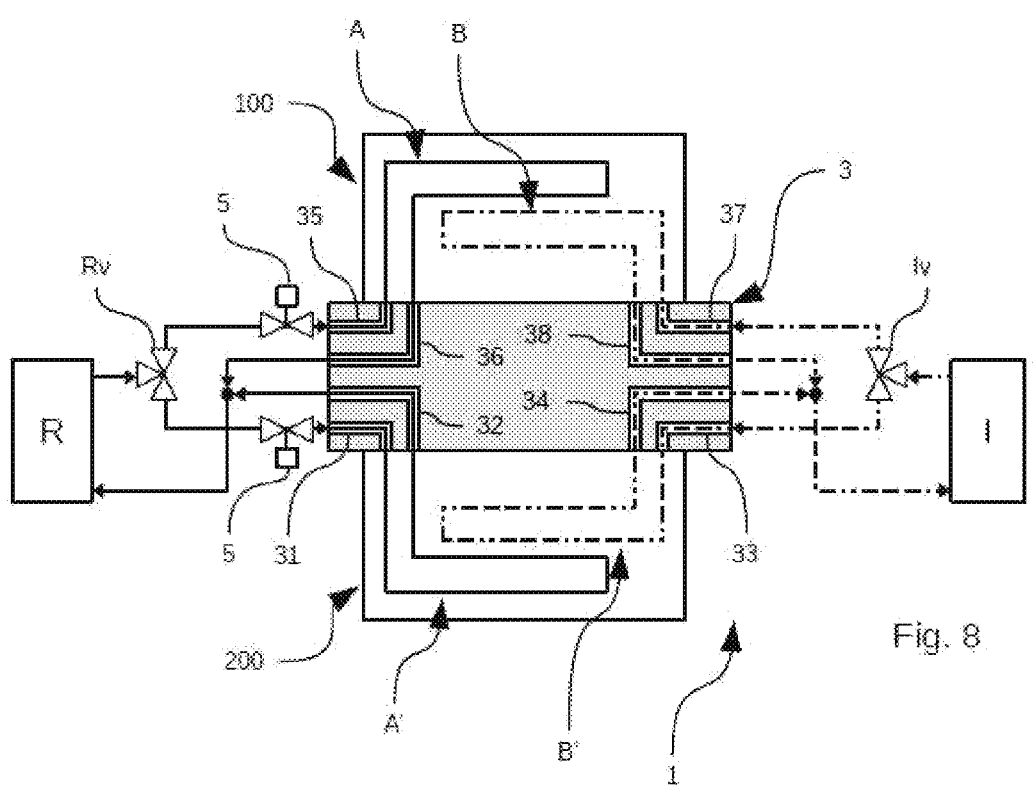
FIG. 8 is a schematic view of a first example of connection architecture for connecting to a heat-energy exchange device.

FIG. 8 shows a first example of architecture in which the heat-energy exchange device 1 is connected to a cooling loop R and to a first loop I for the circulation of heat transfer fluid.

The cooling loop R is connected in parallel on the one hand to the first plate heat exchanger 100 via the fifth 35, sixth 36, first 31 and second 32 channels and on the other hand to the second plate heat exchanger 200 via the first 31 and second 32 channels. Upstream of the first 31 and fifth 35 channels, the distribution member 3 can in particular include expansion devices 5. The distribution of the refrigerant fluid circulating in the cooling loop R can be directed as required to the first 100 and/or the second 200 plate heat exchanger by a three-way valve Rv, for example.

The first loop I is for its part connected in parallel on the one hand to the first plate heat exchanger 100 via the seventh 37 and eighth 38 channels and on the other hand to the second plate heat exchanger 200 via the third 33 and fourth 34 channels. The distribution of the heat transfer fluid circulating in the first loop I can be directed as required to the first 100 and/or the second 200 plate heat exchanger by a three-way valve Iv, for example.

This first loop I can for example be a thermal management loop for the batteries of an electric or hybrid vehicle. It is thus possible, during fast charging, to increase the cooling power of the heat-energy exchange device 1 by simultaneously using the first 100 and the second 200 plate heat exchangers. In what is referred to as normal use, a single plate heat exchanger 100, 200 is used, which limits the risk of a fall in the available thermal power due to a drop in fluid flow rates and poor distribution in the bundle of plates for an oversized plate heat exchanger.

Figure 9:
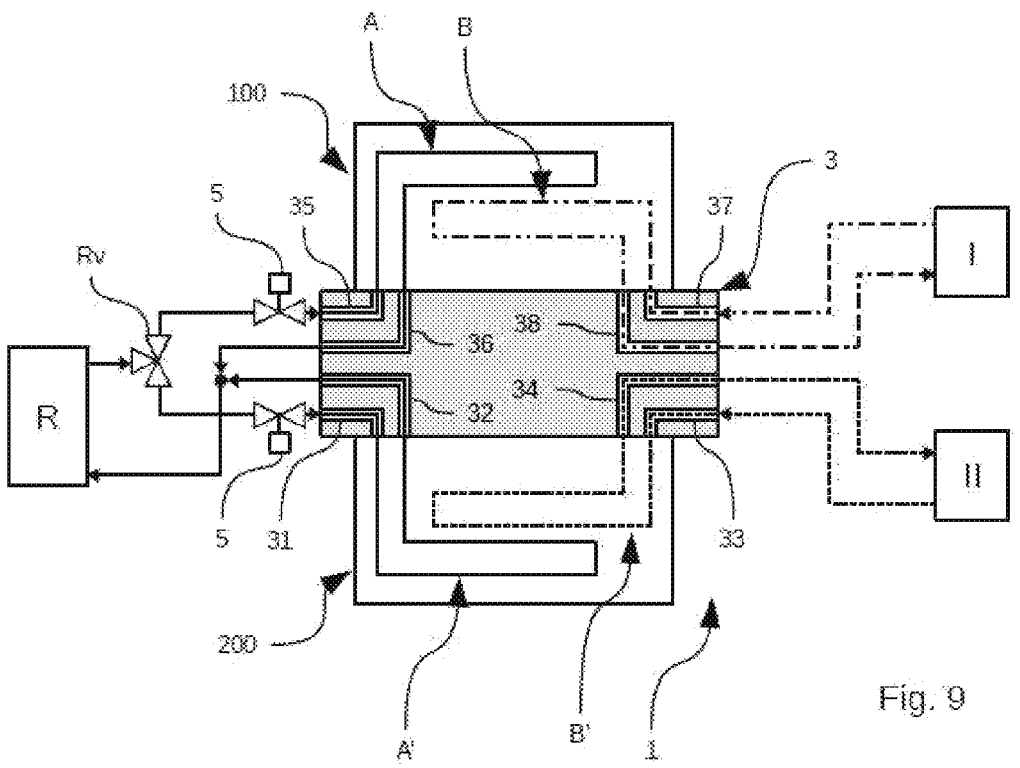
FIG. 9 is a schematic view of a second example of connection architecture for connecting to a heat-energy exchange device.

FIG. 9 shows a second example of architecture in which the heat-energy exchange device 1 is connected to a cooling loop R on the one hand and on the other hand to a first loop I and a second loop II for the circulation of heat transfer fluid.

The cooling loop R is in this case connected as in the first example of FIG. 8. The first loop I is for its part only connected to the first plate heat exchanger 100 via the seventh 37 and eighth 38 channels. The second loop II is for its part only connected to the second plate heat exchanger 200 via the third 33 and fourth 34 channels.

Figure 10:
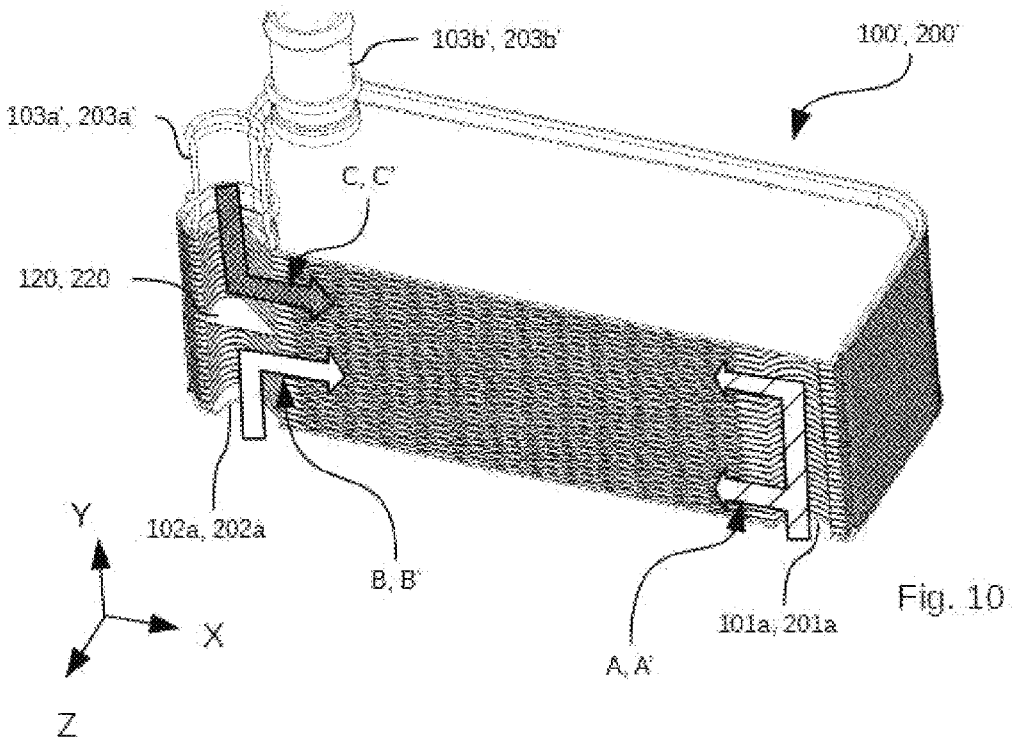
FIG. 10 is a schematic perspective sectional view of a plate heat exchanger according to a particular embodiment.

According to a particular embodiment shown in FIG. 10, at least one of the first 100' or second 200' plate heat exchangers can comprise a third circulation circuit C, C' the heat transfer fluid inlet 103*a*', 203*a*' and outlet 103*b*', 203*b*' of which are arranged outside the distribution member 3. The plate heat exchanger 100', 200' comprises a plate 120, 220, separating the second and the third circulation circuits C, C', for example. These two circuits are thus superimposed in a stack of plates. The first fluid circulation circuit A, A' is configured to allow the heat transfer fluid to circulate over the entire height of the stack of plates and thus allow exchanges of heat energy with both the second B, B' and third C, C' circulation circuits.

Figure 11:
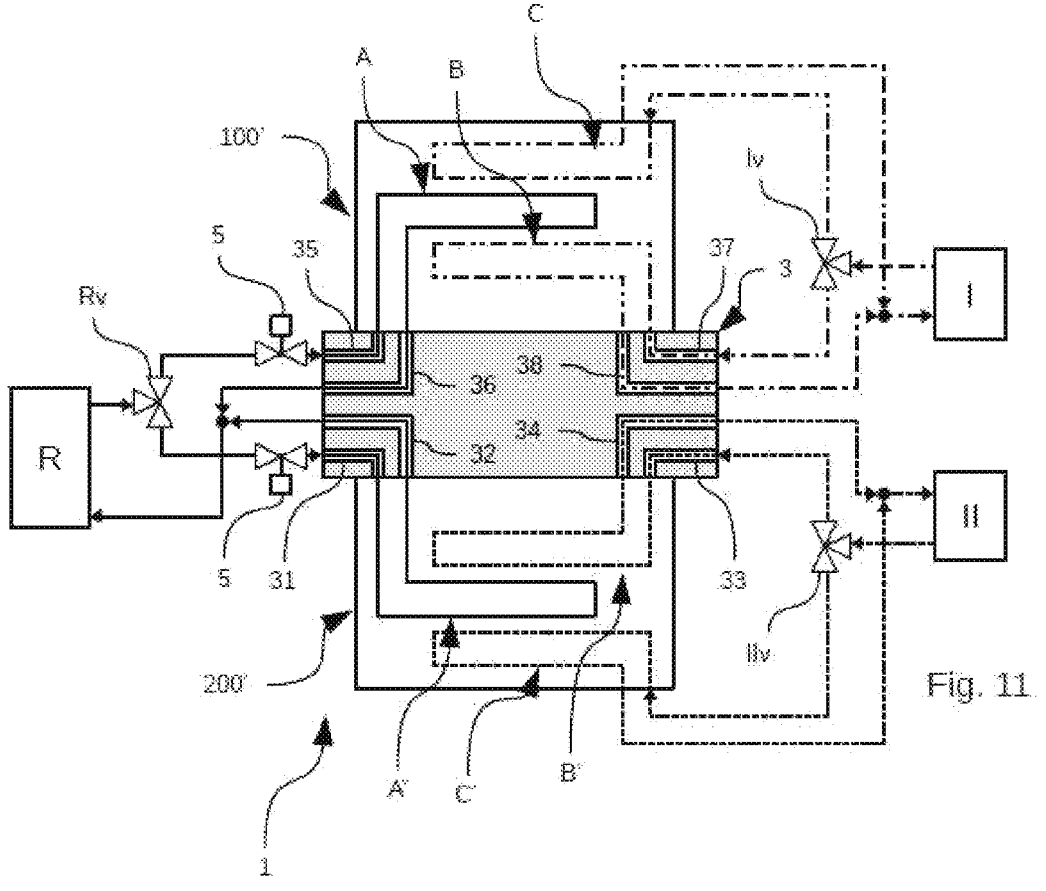
FIG. 11 is a schematic view of a third example of connection architecture for connecting to a heat-energy exchange device.

FIG. 11 shows a third example of architecture in which the first 100' and second 200' plate heat exchangers include a third circulation circuit C, C'. This third example of architecture is similar to the second example of FIG. 9 except that the first loop I is also connected in parallel to the third circulation circuit C of the first plate heat exchanger 100 and that the second loop II is also connected in parallel to the third circulation circuit C' of the second plate heat exchanger 200. The distribution of the heat transfer fluid circulating in the first loop I can be directed as required to the second circulation circuit B and/or to the third circulation circuit C of the first plate heat exchanger 100 by a three-way valve Iv, for example. The distribution of the heat transfer fluid circulating in the second loop II can be directed as required to the second circulation circuit B' and/or to the third circulation circuit C' of the second plate heat exchanger 200 by a three-way valve IIv, for example.

Figure 12:
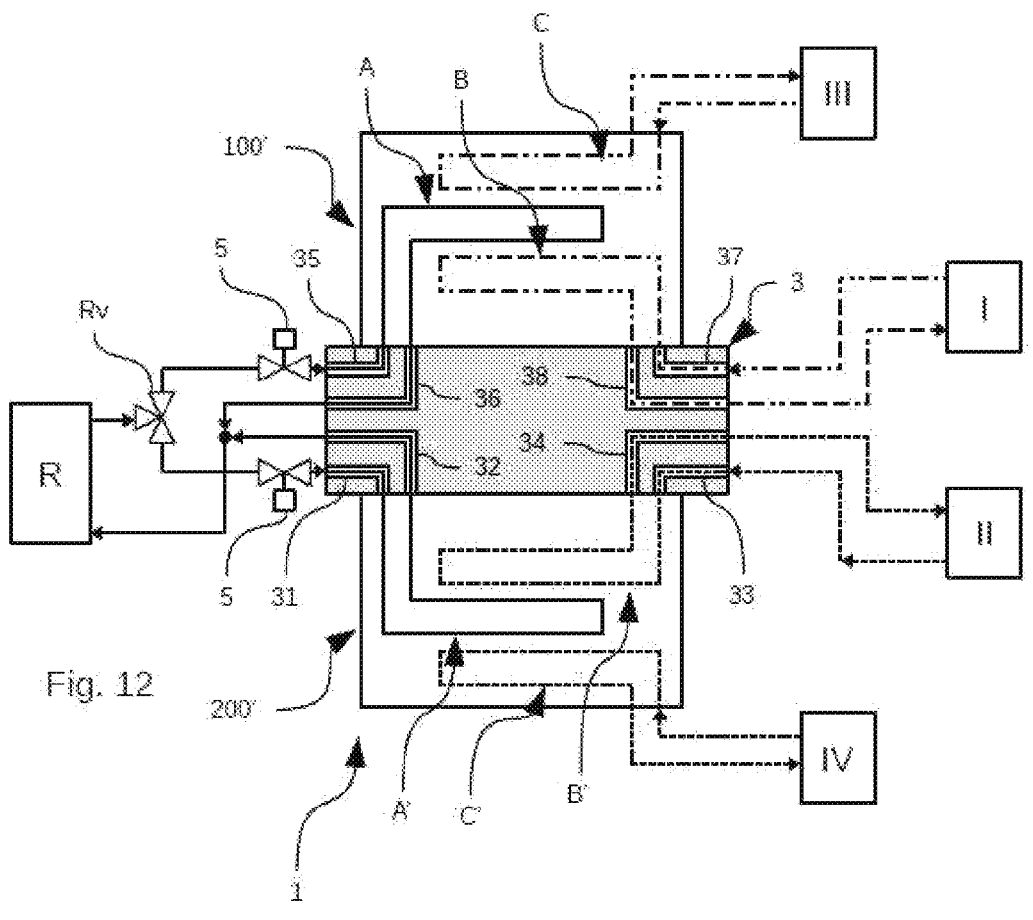
FIG. 12 is a schematic view of a fourth example of connection architecture for connecting to a heat-energy exchange device.

FIG. 12 shows a fourth example of architecture in which the first 100' and second 200' plate heat exchangers include a third circulation circuit C'. This fourth example of architecture is similar to the third example of FIG. 11 except that the third circulation circuit C of the first plate heat exchanger 100' is connected to a third loop III and that the third circulation circuit C' of the second plate heat exchanger 200' is connected to a fourth loop IV.

Thus, it is clear that the heat-energy exchange device 1 not only allows a gain in compactness but also allows easy assembly in the motor vehicle. In addition, its structure with numerous connection ports 31*a*, 32*a*, 33*a*, 34*a*, 35*a*, 36*a*, 37*a*, 38*a*, ensuring the connection with the circulation circuits A, A', B, B', C, C' of the plate heat exchangers 100, 200, allows significant modularity of connections that can meet different needs.

What is claimed is:

1. A heat-energy exchange device comprising a first and a second plate heat exchanger, each plate heat exchanger being configured to allow exchanges of heat energy between at least two heat transfer fluids at different temperatures, wherein the exchange device further includes a distribution member sandwiched between the first and second plate heat exchangers, the distribution member including a series of channels made within the distribution member, the channels connecting heat transfer fluid inlets and outlets of the first and second plate heat exchangers to connection ports arranged on the distribution member, wherein at least some of the connection ports are arranged on an edge of the distribution member.

2. The heat-energy exchange device as claimed in claim 1, wherein the distribution member includes a heat transfer fluid intake connection port connected to a heat transfer fluid inlet of one of the plate heat exchangers, the distribution member including an expansion device for expansion of the heat transfer fluid secured to the heat transfer fluid intake connection port.

3. The heat-energy exchange device as claimed in claim 1, wherein the distribution member includes a heat transfer fluid outlet connection port connected to a heat transfer fluid outlet of one of the plate heat exchangers, the distribution member including an opening emerging in the heat transfer fluid outlet connection port, the heat transfer fluid pressure and temperature sensor being inserted in the opening.

4. The heat-energy exchange device as claimed in claim 2, wherein the heat transfer fluid intake connection port is connected to a heat transfer fluid outlet connection port by a circulation circuit passing through the plate heat exchanger.

5. The heat-energy exchange device as claimed in claim 3, wherein the expansion device and the heat transfer fluid pressure and temperature sensor are arranged within a single assembly module secured to the distribution member.

6. The heat-energy exchange device as claimed in claim 1, wherein the at least two heat transfer fluid circulation circuits of the first and second plate heat exchangers each include a first heat transfer fluid circulation circuit connecting a first heat transfer fluid inlet and a first heat transfer fluid outlet and a second circulation circuit connecting a second heat transfer fluid inlet and a second heat transfer fluid outlet, the distribution member including:

a first face on which the second plate heat exchanger is arranged, the first face including:

a first emerging end of a first channel positioned opposite the first heat transfer fluid inlet of the second plate heat exchanger and connected to first connection port by the first channel, a second emerging end of a second channel positioned opposite the first heat transfer fluid outlet of the second plate heat exchanger and connected to a second connection port by the second channel, a third emerging end of a third channel positioned opposite the second heat transfer fluid inlet of the second plate heat exchanger and connected to a third connection port by the third channel, a fourth emerging end of a fourth channel positioned opposite the second heat transfer fluid outlet of the second plate heat exchanger and connected to a fourth connection port by the fourth channel, a second face on which the first plate heat exchanger is arranged, the second face including:

a fifth emerging end of a fifth channel positioned opposite the first heat transfer fluid inlet of the first plate heat exchanger and connected to a fifth connection port by the fifth channel, a sixth emerging end of a sixth channel positioned opposite the first heat transfer fluid outlet of the first plate heat exchanger and connected to a sixth connection port by the sixth channel, a seventh emerging end of a seventh channel positioned opposite the second heat transfer fluid inlet of the first plate heat exchanger and connected to a seventh connection port by the seventh channel, an eighth emerging end of an eighth channel positioned opposite the second heat transfer fluid outlet of the first plate heat exchanger and connected to an eighth connection port by the eighth channel.

7. The heat-energy exchange device as claimed in claim 6, wherein at least one of the first or second plate heat exchangers includes a third circulation circuit, the heat transfer fluid inlet and outlet of which are arranged outside the distribution member.

8. The heat-energy exchange device as claimed in claim 6, wherein the distribution member is made up of two components, a first component including:

a first face on which the second plate heat exchanger is arranged, the first face including the first emerging end of the first channel and the second emerging end of the second channel, and a second face on which the first plate heat exchanger is arranged, the second face including the seventh emerging end of the seventh channel and the eighth emerging end of the eighth channel, a second component including:

a first face on which the second plate heat exchanger is arranged, the first face including the third emerging end of the third channel and the fourth emerging end of the fourth channel, and a second face on which the first plate heat exchanger is arranged, the second face including the fifth emerging end of the fifth channel and the sixth emerging end of the sixth channel.

9. The heat-energy exchange device as claimed in claim 1, wherein the distribution member is made in one piece.

10. The heat-energy exchange device as claimed in claim 1, wherein the distribution member includes a heat transfer fluid outlet connection port connected to a heat transfer fluid outlet of one of the plate heat exchangers, the distribution member including an opening emerging in the heat transfer fluid outlet connection port, a heat transfer fluid pressure or temperature sensor being inserted in the opening.

11. The heat-energy exchange device as claimed in claim 4, wherein the expansion device and the heat transfer fluid pressure or temperature sensor are arranged within a single assembly module secured to the distribution member.

12. A heat-energy exchange device comprising a first and a second plate heat exchanger, each plate heat exchanger being configured to allow exchanges of heat energy between at least two heat transfer fluids at different temperatures, wherein the heat-energy exchange device includes a distribution member sandwiched between the first and second plate heat exchangers, the distribution member including a heat transfer fluid outlet connection port connected to a heat transfer fluid outlet of one of the plate heat exchangers, the distribution member including an opening emerging in the heat transfer fluid outlet connection port.

13. The heat-energy exchange device as claimed in claim 12, wherein the distribution member includes a heat transfer fluid intake connection port connected to a heat transfer fluid inlet of one of the plate heat exchangers, the distribution member including an expansion device for expansion of the heat transfer fluid secured to the heat transfer fluid intake connection port.

14. The heat-energy exchange device as claimed in claim 12, wherein the heat transfer fluid intake connection port is connected to a heat transfer fluid outlet connection port by a circulation circuit passing through the plate heat exchanger.

15. The heat-energy exchange device as claimed in claim 12, wherein a heat transfer fluid pressure and temperature sensor are inserted in the opening.

16. The heat-energy exchange device as claimed in claim 15, wherein the expansion device and the heat transfer fluid pressure and temperature sensor are arranged within a single assembly module secured to the distribution member.

17. A heat-energy exchange device comprising a first and a second plate heat exchanger, each plate heat exchanger being configured to allow exchanges of heat energy between at least two heat transfer fluids at different temperatures, wherein the heat-energy exchange device includes a distribution member sandwiched between the first and second plate heat exchangers, the distribution member including a series of channels made within the distribution member, a heat transfer fluid outlet connection port connected to a heat transfer fluid outlet of one of the plate heat exchangers, and an opening emerging in the heat transfer fluid outlet connection port.

18. The heat-energy exchange device as claimed in claim 17, wherein the channels connect heat transfer fluid inlets and outlets of the first and second plate heat exchangers to connection ports arranged on the distribution member.

19. The heat-energy exchange device as claimed in claim 17, wherein a heat transfer fluid pressure and temperature sensor are inserted in the opening.

20. The heat-energy exchange device as claimed in claim 18, wherein at least some of the connection ports are arranged on an edge of the distribution member.

\* \* \* \* \*